(12) United States Patent
Fouda et al.

(10) Patent No.: US 10,302,800 B2
(45) Date of Patent: May 28, 2019

(54) CORRECTING FOR MONITORING ELECTRODES CURRENT LEAKAGE IN GALVANIC TOOLS

(71) Applicant: Halliburton Energy Services, Inc., Houston, TX (US)

(72) Inventors: Ahmed E. Fouda, Houston, TX (US); Burkay Donderici, Houston, TX (US); Luis Emilio San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 320 days.

(21) Appl. No.: 15/123,592

(22) PCT Filed: Oct. 1, 2015

(86) PCT No.: PCT/US2015/053546
§ 371 (c)(1),
(2) Date: Sep. 2, 2016

(87) PCT Pub. No.: WO2016/057312
PCT Pub. Date: Apr. 14, 2016

(65) Prior Publication Data
US 2017/0075023 A1 Mar. 16, 2017

Related U.S. Application Data

(60) Provisional application No. 62/062,600, filed on Oct. 10, 2014.

(51) Int. Cl.
*G01V 3/00* (2006.01)
*G01V 3/02* (2006.01)
(Continued)

(52) U.S. Cl.
CPC ............... *G01V 3/24* (2013.01); *E21B 47/12* (2013.01); *E21B 49/003* (2013.01); *G01V 9/005* (2013.01)

(58) Field of Classification Search
CPC ... G01V 3/00; G01V 3/02; G01V 3/18; G01V 3/20; G01V 3/24; G01V 9/00; E21B 47/12; E21B 49/00; G01R 35/00
See application file for complete search history.

(56) References Cited

U.S. PATENT DOCUMENTS 7,298,147 B2 11/2007 Benimeli et al.
8,030,937 B2 * 10/2011 Hu .......................... G01V 3/24
324/366

(Continued)

FOREIGN PATENT DOCUMENTS

WO 2016057946 A1 4/2016
WO 2016057948 A1 4/2016

OTHER PUBLICATIONS

International Preliminary Report on Patentability issued in related Application No. PCT/US2015/053546, dated Apr. 20, 2017 (12 pages).

(Continued)

*Primary Examiner* — Neel D Shah
(74) *Attorney, Agent, or Firm* — Benjamin Fite; Baker Botts L.L.P.

(57) ABSTRACT

An example method may include computing a database for an ideal representation of a galvanic tool, and determining internal coupling impedance between at least one monitor electrode of the galvanic tool and a reference. Voltage and current measurements from the galvanic tool positioned within a formation may be received. A formation resistivity from the voltage and current measurements may be calcu- (Continued)

lated based, at least in part, on the database and the determined internal coupling impedances.

18 Claims, 4 Drawing Sheets

(51) Int. Cl.
    *G01V 3/18* (2006.01)
    *G01V 3/20* (2006.01)
    *G01V 3/24* (2006.01)
    *E21B 47/12* (2012.01)
    *E21B 49/00* (2006.01)
    *G01V 9/00* (2006.01)

(56) References Cited

U.S. PATENT DOCUMENTS

| | | | |
|---|---|---|---|
| 2005/0127917 A1* | 6/2005 | Barber | G01V 3/20 |
| | | | 324/338 |
| 2005/0179437 A1 | 8/2005 | Hayman et al. | |
| 2008/0278171 A1* | 11/2008 | Itskovich | G01V 3/24 |
| | | | 324/355 |
| 2011/0025336 A1* | 2/2011 | Forgang | G01V 3/20 |
| | | | 324/367 |
| 2011/0204897 A1* | 8/2011 | Hu | G01V 3/24 |
| | | | 324/351 |
| 2013/0234718 A1* | 9/2013 | Li | G01V 3/20 |
| | | | 324/355 |
| 2013/0257436 A1 | 10/2013 | Bittar et al. | |

OTHER PUBLICATIONS

Shattuck, D., M. Bittar, and Liang C. Shen. "Scale modeling of the laterolog using synthetic focusing methods," The Log Analyst 28.4 (1987): 357-369.

Smits, J. W., et al. "Improved resistivity interpretation utilizing a new array laterolog tool and associated inversion processing." SPE Paper 49328, SPE Annual Technical Conference and Exhibition. Society of Petroleum Engineers, 1998.

Cozzolino, Klaus, and Jadir da Conceição da Silva. "Synthetic focusing and simulation of dual laterolog tool in axisymmetric subsurface models." Journal of Applied Geophysics 61.2 (2007): 102-110.

International Search Report and Written Opinion issued in related PCT Application No. PCT/US2015/053546 dated Dec. 17, 2015, 13 pages.

* cited by examiner

CORRECTING FOR MONITORING ELECTRODES CURRENT LEAKAGE IN GALVANIC TOOLS

CROSS-REFERENCE TO RELATED APPLICATION

The present application is a U.S. National Stage Application of International Application No. PCT/US2015/053546, filed Oct. 1, 2015, which claims benefit of U.S. Provisional Application No. 62/062,600, entitled "Correcting for Monitoring Electrodes Current Leakage in Galvanic Tools", filed Oct. 10, 2014, both of which are incorporated herein by reference for all purposes.

BACKGROUND

The present disclosure relates generally to well drilling operations and, more particularly, to correcting for monitoring electrode current leakage in galvanic tools.

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore through and/or into the subterranean formation at a desired well site, treating the wellbore to optimize production of hydrocarbons, and performing the necessary steps to produce and process the hydrocarbons from the subterranean formation.

Existing well drilling operations require information on formation characteristics to aid in drilling decisions. Numerous measurement techniques are used, including logging while drilling (LWD), measuring while drilling (MWD), and wireline. One such measurement technique includes the use of a galvanic tool to take resistivity measurements of the surrounding formation. Galvanic tools may include one or more electrodes through which current is injected into and returned from the formation to generate the resistivity measurements. During typical operation current should ideally only flow between selected ones of the electrodes. In practice, however, "leakage current" may run through other ones of the electrodes. This may reduce the accuracy of the resulting resistivity measurements.

FIGURES

Some specific exemplary embodiments of the disclosure may be understood by referring, in part, to the following description and the accompanying drawings.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to well drilling operations and, more particularly, to correcting for monitoring electrode current leakage in galvanic tools.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation specific decisions are made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon wells. Embodiments may be implemented using a tool that is made suitable for testing, retrieval and sampling along sections of the formation. Embodiments may be implemented with tools that, for example, may be conveyed through a flow passage in tubular string or using a wireline, slickline, coiled tubing, downhole robot or the like.

The terms "couple" or "couples" as used herein are intended to mean either an indirect or a direct connection. Thus, if a first device couples to a second device, that connection may be through a direct connection or through an indirect mechanical or electrical connection via other devices and connections. Similarly, the term "communicatively coupled" as used herein is intended to mean either a direct or an indirect communication connection. Such connection may be a wired or wireless connection such as, for example, Ethernet or LAN. Such wired and wireless connections are well known to those of ordinary skill in the art and will therefore not be discussed in detail herein. Thus, if a first device communicatively couples to a second device, that connection may be through a direct connection, or through an indirect communication connection via other devices and connections.

Modern petroleum drilling and production operations demand information relating to parameters and conditions downhole. Several methods exist for downhole information collection, including LWD, MWD, and wireline. In LWD, data is typically collected during the drilling process, thereby avoiding any need to remove the drilling assembly to insert a wireline logging tool. LWD consequently allows the driller to make accurate real-time modifications or corrections to optimize performance while minimizing down time. MWD is the term for measuring conditions downhole concerning the movement and location of the drilling assembly while the drilling continues. LWD concentrates more on formation parameter measurement. While distinctions between MWD and LWD may exist, the terms MWD and LWD often are used interchangeably. For the purposes of this disclosure, the term LWD will be used with the understanding that this term encompasses both the collection of formation parameters and the collection of information relating to the movement and position of the drilling assembly.

According to aspects of the present disclosure, resistivity measurements from a galvanic tool may be improved by correcting for leakage currents through the monitor or voltage electrodes of the galvanic tool. As used herein, a galvanic tool may comprise any tool comprising electrodes through which current is injected into a subterranean formation and a voltage distribution is generated in the formation. One or both of the injected current, and the generated voltages is measured. Example galvanic tools include but are not limited to array laterologs, dual laterologs, and micro-resistivity logs.

Figures 1, 2:
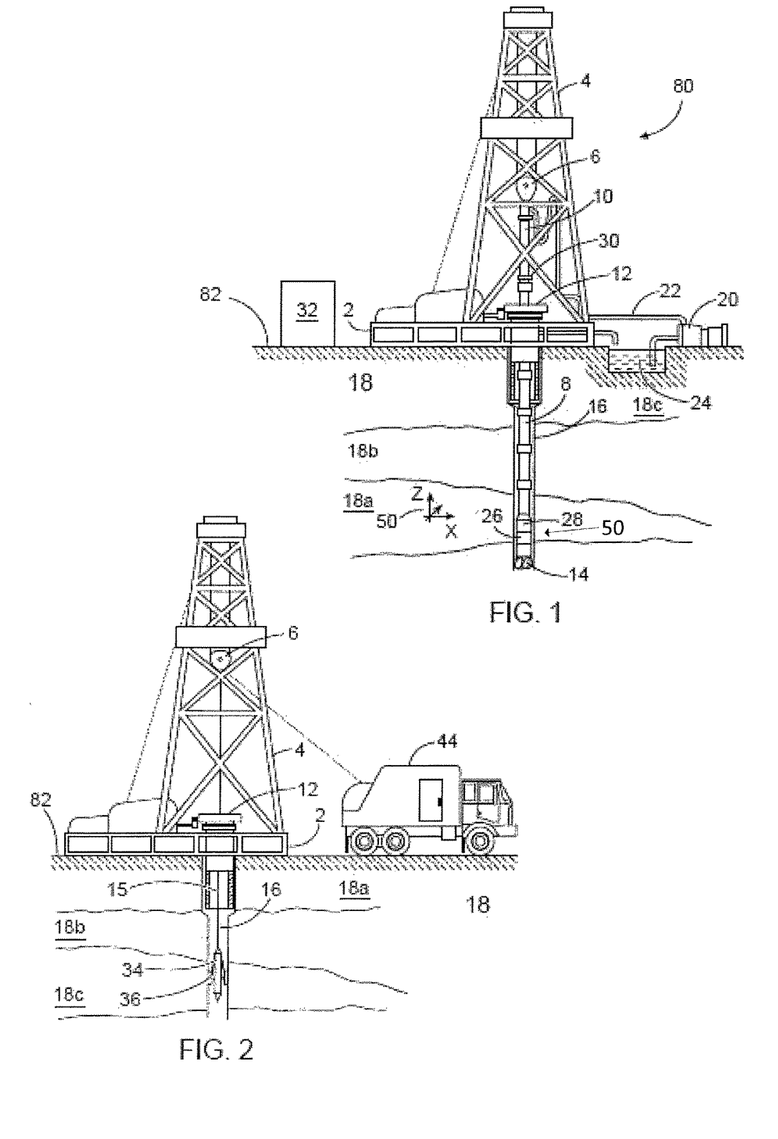
FIG. 1 is a diagram showing an illustrative logging while drilling environment, according to aspects of the present disclosure.
FIG. 2 is a diagram showing an illustrative wireline logging environment, according to aspects of the present disclosure.

FIG. 1 is a diagram showing a subterranean drilling system 80 incorporating at least one galvanic tool 26, according to aspects of the present disclosure. The drilling system 80 comprises a drilling platform 2 positioned at the surface 82. In the embodiment shown, the surface 82 comprises the top of a formation 84 containing one or more rock strata or layers 18a-c, and the drilling platform 2 may be in contact with the surface 82. In other embodiments, such as in an off-shore drilling operation, the surface 82 may be separated from the drilling platform 2 by a volume of water.

The drilling system 80 comprises a derrick 4 supported by the drilling platform 2 and having a traveling block 6 for raising and lowering a drill string 8. A kelly 10 may support the drill string 8 as it is lowered through a rotary table 12. A drill bit 14 may be coupled to the drill string 8 and driven by a downhole motor and/or rotation of the drill string 8 by the rotary table 12. As bit 14 rotates, it creates a borehole 16 that passes through one or more rock strata or layers 18. A pump 20 may circulate drilling fluid through a feed pipe 22 to kelly 10, downhole through the interior of drill string 8, through orifices in drill bit 14, back to the surface via the annulus around drill string 8, and into a retention pit 24. The drilling fluid transports cuttings from the borehole 16 into the pit 24 and aids in maintaining integrity or the borehole 16.

The drilling system 80 may comprise a bottom hole assembly (BHA) coupled to the drill string 8 near the drill bit 14. The BHA may comprise various downhole measurement tools and sensors and LWD and MWD elements, including the galvanic tool 26. As the bit extends the borehole 16 through the formations 18, the tool 26 may collect resistivity measurements relating to borehole 16 and the formation 84. In certain embodiments, the orientation and position of the tool 26 may be tracked using, for example, an azimuthal orientation indicator, which may include magnetometers, inclinometers, and/or accelerometers, though other sensor types such as gyroscopes may be used in some embodiments.

The tools and sensors of the BHA including the tool 26 may be communicably coupled to a telemetry element 28. The telemetry element 28 may transfer measurements from tool 26 to a surface receiver 30 and/or to receive commands from the surface receiver 30. The telemetry element 28 may comprise a mud pulse telemetry system, and acoustic telemetry system, a wired communications system, a wireless communications system, or any other type of communications system that would be appreciated by one of ordinary skill in the art in view of this disclosure. In certain embodiments, some or all of the measurements taken at the tool 26 may also be stored within the tool 26 or the telemetry element 28 for later retrieval at the surface 82.

In certain embodiments, the drilling system 80 may comprise a surface control unit 32 positioned at the surface 102. The surface control unit 32 may comprise an information handling system communicably coupled to the surface receiver 30 and may receive measurements from the tool 26 and/or transmit commands to the tool 26 though the surface receiver 30. The surface control unit 32 may also receive measurements from the tool 26 when the tool 26 is retrieved at the surface 102. The surface control unit 32 may process the measurements received from the tool 26 to calculate one or more parameters of the formation, such as the resistivity of the formation. As will be described in detail below, processing the measurements received from the tool 26 to calculate one or more parameters of the formation may include adjusting for one or more leakage currents within the tool 26. In certain embodiments, some or all of the measurements may be processed, stored, and/or visualized at a different information handling system, such as a downhole controller associated with the tool 26 or BHA and/or or a remote information handling system that may receive the galvanic measurements through a wireless transmission medium, such as a local area network or a satellite network.

At various times during the drilling process, the drill string 8 may be removed from the borehole 16 as shown in FIG. 2. Once the drill string 8 has been removed, measurement/logging operations can be conducted using a wireline tool 34, e.g., an instrument that is suspended into the borehole 16 by a cable 15 having conductors for transporting power to the tool and telemetry from the tool body to the surface 102. The wireline tool 34 may comprise a galvanic tool 36, similar to the tool 26 described above. The tool 36 may be communicatively coupled to the cable 15. A logging facility 44 (shown in FIG. 8 as a truck, although it may be any other structure) may collect measurements from the tool 36, and may include computing facilities (including, e.g., a control unit/information handling system) for controlling, processing, storing, and/or visualizing the measurements gathered by the tool 36. The computing facilities may be communicatively coupled to the tool 36 by way of the cable 15. In certain embodiments, the control unit 32 may serve as the computing facilities of the logging facility 44. Additionally, as described above, a remote information handling system may receive and process, store, and/or visualize galvanic measurements received from the tool 36.

Figure 3:
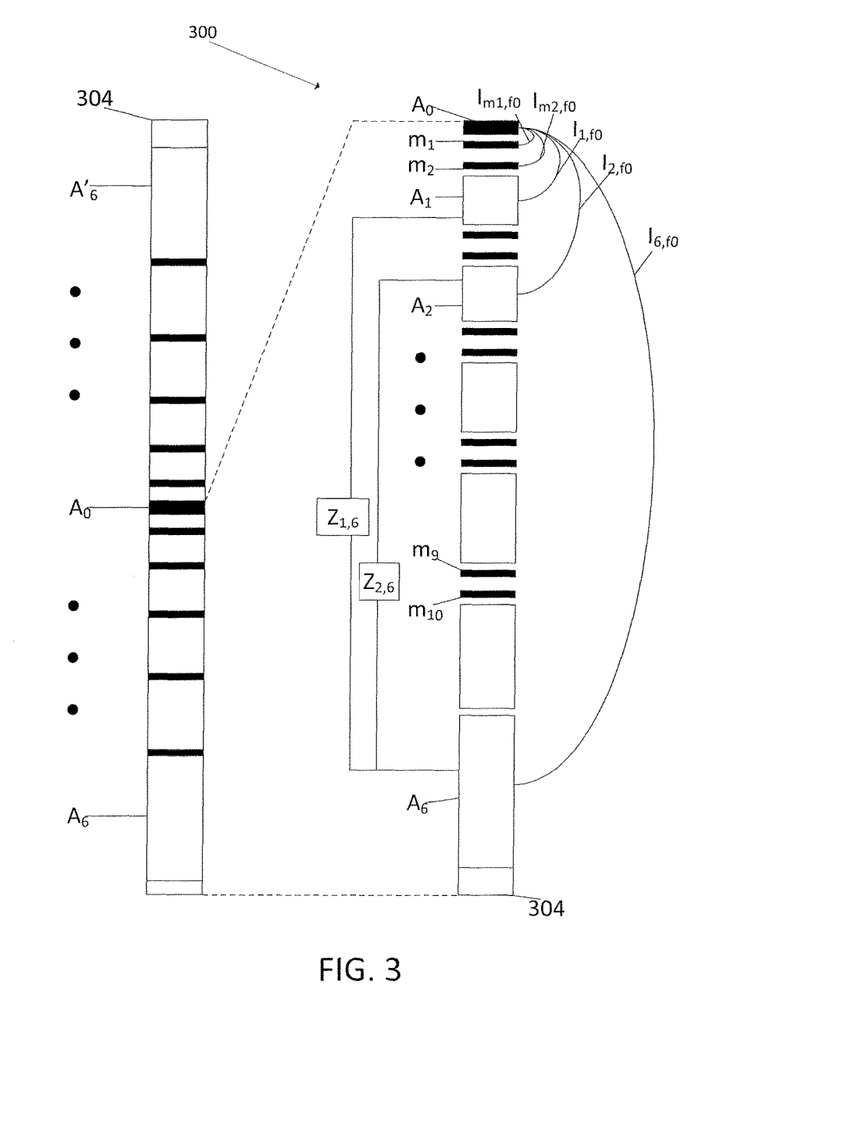
FIG. 3 is a diagram of an example galvanic tool, according to aspects of the present disclosure.

FIG. 3 illustrates an example galvanic tool 300, according to aspects of the present disclosure. The galvanic tool 300 may include similar functionality as and/or be incorporated in the LWD/MWD elements within the BHA described with reference to FIG. 1. Additionally, the galvanic tool 300 may include similar functionality as and/or be incorporated in the wireline logging or measurements devices within the wireline system described with reference to FIG. 2.

The galvanic tool 300 comprises an array laterolog positioned on a mandrel or tool body 302. Although an array laterolog is depicted, it is not intended to be limiting. The tool 300 comprises a central current electrode, or survey electrode, $A_0$, coupled to the tool body 302 and surrounded symmetrically by additional current electrodes $A_1$-$A_6$ and $A_1'$-$A_6'$, which may form current return electrode pairs $A_1/A_1'$-$A_6/A_6'$. Voltage or monitor electrodes $M_1$-$M_{10}$ may be spaced between the current electrodes on one side of the survey electrode $A_0$, and each of the monitor electrodes $M_1$-$M_{10}$ may form a monitor electrode pair with an electrode (not shown) placed symmetrically on an opposite side of the survey electrode $A_0$. Each of the current and monitor electrodes also may be coupled to the tool body 302. As depicted, the tool 300 is characterized by internal coupling impedances between the each current electrode $A_0$-$A_6$, as well as internal coupling impedances between the monitor electrodes $M_1$-$M_{10}$ and a reference electrode, such as armor 304 surrounding the wireline cable coupled to the galvanic tool. For illustrative purposes, an internal impedance $Z_{1,6}$ between the current electrodes $A_1$ and $A_6$, and an internal impedance $Z_{2,6}$ between the current electrodes $A_2$ and $A_6$ have been depicted.

In use, the galvanic tool 300 may be introduced into a borehole and a current may be injected into the formation from a survey electrode. The injected current may be received or returned at any one or more of the current electrode pairs selected to receive the injected current. A voltage induced in the formation by the injected current may be measured by one or more of the monitor electrodes $M_1$-$M_{10}$. In certain embodiments, the tool 300 may the characterized by excitation modes in which different ones of the current or voltage electrodes are energized. For instance, assuming electrode $A_6$ comprises the current return, the tool 300 may be characterized by excitation modes $f_0$-$f_5$ that respectively correspond to the excitation of current electrodes $A_0$-$A_5$. The tool may further be characterized by excitation modes $f_{m1}$-$f_{m10}$ corresponding to current injected from voltage electrodes $M_1$-$M_{10}$ and returning at the armor. Each excitation mode produces voltage measurements in response to the injected current.

An excitation mode $f_0$ in which electrode $A_0$ is excited and an example current $I_{0,f0}$ has been generated between the survey electrode $A_0$ and the return electrode $A_6$. In an ideal tool, infinite internal coupling impedances between the current electrodes and monitor electrodes may prevent current from being received the monitor electrodes $M_1$-$M_{10}$ of the tool 300, and at any of the current electrodes $A_1$-$A_6$ of the tool 300 not functioning as the current return when the current $I_{0,f0}$ is generated. The tool 300, however, comprises a realistic tool with finite internal coupling impedances. These finite internal coupling impedances allow for leakage currents to flow between the survey electrode $A_0$ and the other current and monitor electrodes of the tool 300. These leakage currents include, but are not limited to, leakage currents $I_{1,f0}$ and $I_{2,f0}$ to flow between the current electrode $A_0$ and the current electrodes $A_1$ and $A_2$ respectively, and leakage currents $I_{M1,f0}$ and $I_{M2,f0}$ to flow between the electrode $A_0$ and the monitor electrodes $M_1$ and $M_2$ respectively.

When deployed downhole within a formation, raw measurement generated at the tool 300 may then be stored at the tool 300 for later retrieval and processing, or transmitted to a remote information handling system, such as an information handling system communicably coupled to the tool 300 through a wireline (not show), for processing in real-time or near real time. The measurements may be processed to account for the leakage currents and determine resistivity characteristics of the formation, as will be described below. In certain embodiments, measurements may be generated, measured, stored, and/or transmitted by a control system associated with the tool 300.

Figure 4:
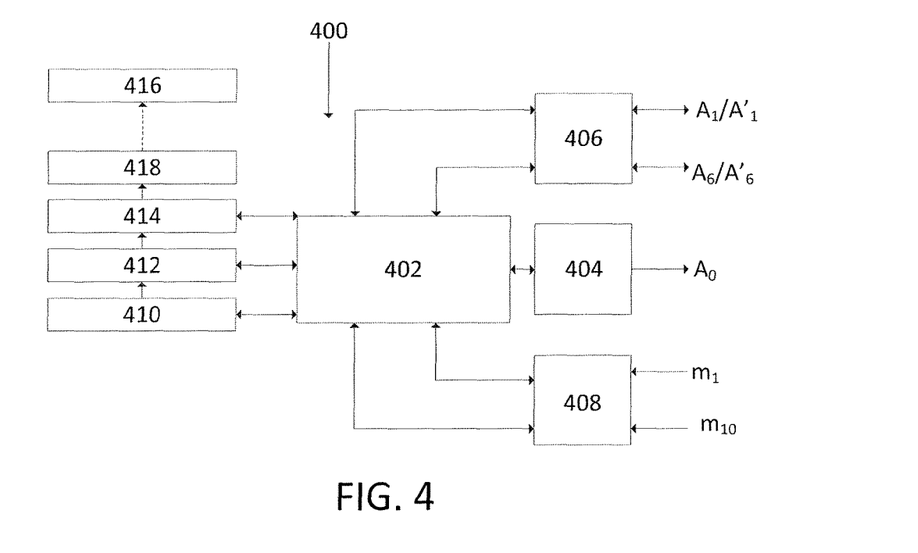
FIG. 4 is a diagram of an example control system for a galvanic tool, according to aspects of the present disclosure.

FIG. 4 is a diagram of an example control system 400 for galvanic tool similar to the tool described above with reference to FIG. 3. As depicted, the system 400 comprises a control unit 402 that may function as the primary controller for the tool and may be communicably coupled to a survey electrode $A_0$ through associated electronics 404; communicably coupled to current return electrode pairs $A_1/A_1'$-$A_6/A_6'$ through associated electronics 406; and communicably coupled to voltage or monitor electrodes $M_1$-$M_{10}$ through associated electronics 408. As used herein, a controller may include an information handling system or any other device that contains at least one processor configured to perform certain actions. Example processors include, but are not limited to, microprocessors, microcontrollers, digital signal processors (DSP), application specific integrated circuits (ASIC), or any other digital or analog circuitry configured to interpret and/or execute program instructions and/or process data.

The control unit 402 may function through the associated electronics 404 to cause the survey electrode $A_0$ to inject a current into a formation. The control unit 402 may also receive through the associated electronics 408 measurements from the voltage or monitor electrodes $M_1$-$M_{10}$ that correspond to the voltage developed in the formation by the injected current. In certain embodiments, the control unit 402 may also function through the associated electronics 406 to select which of the current return electrode pairs $A_1/A_1'$-$A_6/A_6'$ function as the current return for the injected current, and may also function to select which of the voltage or monitor electrodes $M_1$-$M_{10}$ obtain voltage measurements from the formation at a given time. The control unit 402 may make the above selections of the current return electrode pairs $A_1/A_1'$-$A_6/A_6'$ and voltage or monitor electrodes $M_1$-$M_{10}$ through the use of one of more switches within the relevant associated electronics 406/408, for instance, that the control unit 402 may control and through which the current return electrode pairs $A_1/A_1'$-$A_6/A_6'$ and voltage or monitor electrodes $M_1$-$M_{10}$ may be selectively connected to the control unit 402.

In addition to receiving measurements from the voltage or monitor electrodes $M_1$-$M_{10}$ corresponding to the induced voltage within the formation, the control unit 402 may also receive measurements corresponding to the currents generated by and received at the current and monitor electrodes. For instance, the control unit 402 may receive measurements corresponding to the strength of the current generated by the survey electrode A0, and the strength of the leakage currents received through the voltage and current electrodes, and the voltage measurements from the voltage electrodes. The control unit 402 may transmit the received current and voltage measurements to a data acquisition unit 410 coupled to the control unit 402. Upon reception at the data acquisition unit 410, the measurements may be digitized, stored in a data buffer 412, preprocessed at data processing unit 414, and sent to the surface 416 through a communication unit 418, which may comprise a downhole telemetry system. Alternatively, the raw or processed measurements may be stored in the control system 400. Modifications, additions, or omissions may be made to FIG. 4 without departing from the scope of the present disclosure. For instance, the orientation and configuration of the control system may by altered, depending on the application.

Certain voltage and current measurements generated at the galvanic tool may be used to determine resistivity characteristics of the formation in which the measurements were taken. Typically, galvanic tools are modeled using a standard set of linear equations that relate the measured voltages at the monitor electrodes with the transmitted/received currents of the current electrodes. This model then is used to calculate the resistivity of the formation based on the measured voltages from the voltage electrodes. The standard set of linear equations, however, assumes there are infinite internal coupling impedances between the current electrodes of the tool and, therefore, that all current transmitted from the survey electrode $A_0$ flows through the formation into the selected current return electrode pair. In practice, as described above, there are finite internal coupling impedances between the current electrodes and between voltage electrodes and the reference electrode such that some of the transmitted current from the survey electrode $A_0$ will flow to the selected current return electrode pair through the non-selected current electrodes and voltage electrodes as leakage current. The presence of leakage current reduces the amount of injected current within the formation, causing the physical implementation of the tool to depart from the linear relationships used in the typical galvanic tool model. Additionally, the amount of leakage current can be varied by a sometimes indeterminate amount due to the downhole temperature and pressure effects on the internal coupling impedances of the downhole tool, further reducing the accuracy of the determined formation resistivity.

Once current and voltage measurements are taken downhole, these raw measurements may be transmitted to an information handling system either at the surface or downhole, as described above, and processed to determine formation resistivity vales. The processing may comprise processing steps on the raw data and the use of an inversion algorithm to calculate resistivity values from the processed measurements. In certain instances, an inversion database with pre-calculated values may be accessed when using an inversion algorithm to calculate resistivity values from the processed measurements. According to aspects of the present disclosure, the leakage currents may be corrected for by modifying the pre-calculated inversion database to account for the leakage current due to finite impedances between the monitor electrodes and reference electrode.

Figure 5:
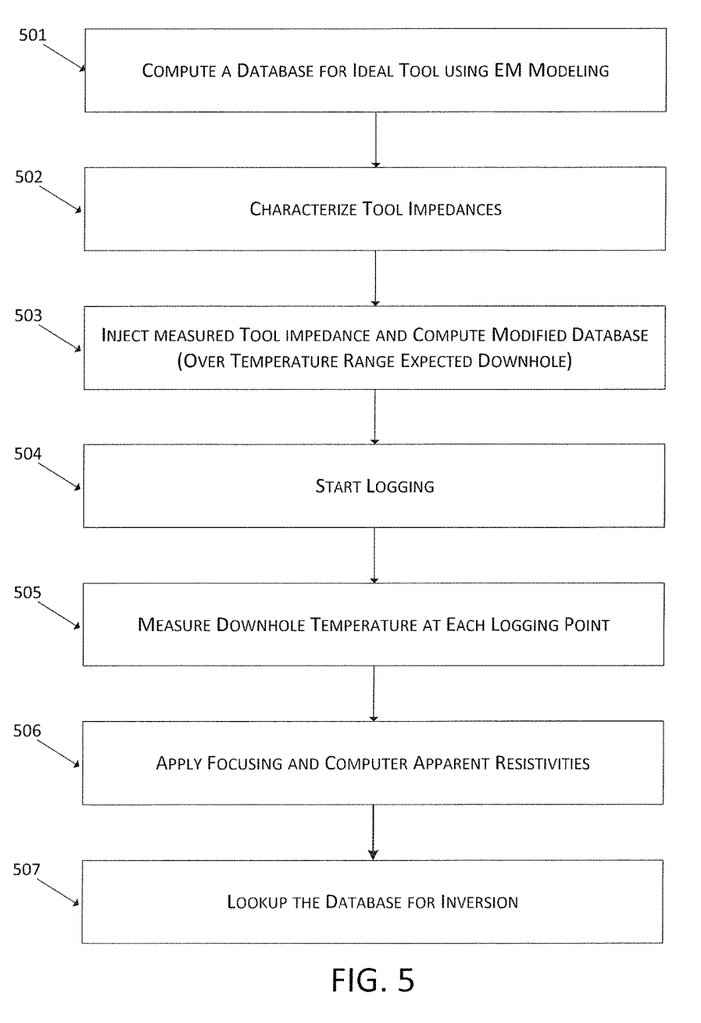
FIG. 5 is a diagram illustrating an example method, according to aspects of the present disclosure.

FIG. 5 is a diagram illustrating an example method, according to aspects of the present disclosure. Step 501 may comprise computing an inversion database for an ideal galvanic tool. Computing the inversion database may include, for instance, calculating voltage and current responses of an ideal galvanic tool with infinite internal coupling impedances to a variety of different excitations. For instance, a computed inversion database may include voltage and current responses to excitation modes obtained by exciting each one of the current electrodes of the galvanic tool, as well as voltage and current responses to excitation modes obtained by exciting each one of the voltage electrodes of the galvanic tool. The excitation modes may be computed using a mathematical representation of a galvanic tool within an idealized formation with a known resistivity value. Alternatively, the voltage and current responses may be generated by placing an actual galvanic tool in a calibration box that emulates the responses of formations with differing resistivity values.

Step 502 may comprise determining the internal coupling impedances between at least two electrodes of the galvanic tool. In certain embodiments, determining the internal coupling impedances may comprise determining the internal coupling impedances between all of the electrodes of the galvanic tool. In other embodiments, determining the internal coupling impedances may comprise determining the internal coupling impedances between the monitor electrodes of the galvanic tool and a reference. The internal coupling impedances may be physically measured at the galvanic tool or calculated with knowledge of the components used within the tool. In certain embodiments, determining the internal coupling impedances may comprise determining the internal coupling impedance corresponding to each of the excitation modes of the galvanic tool and over the temperature range expect to be encountered downhole. Step 502 may be performed, for instance, when a galvanic tool is being manufactured or assembled, during a calibration step performed remote from a drilling operation, or during a calibration step performed at the site of the drilling operation. These determined internal coupling impedances may be stored or otherwise associated with the tool.

Step 503 may comprise injecting the determined internal coupling impedances into the existing inversion database and calculating a modified inversion database. In certain embodiments, for each temperature within the range of temperatures used to determine the internal coupling impedances, the set of measured impedances may be injected into an existing database pre-calculated for an ideal galvanic tool by solving the following equations for each of the operation modes $f_j$, j=0, 1, . . . 5:

$$\begin{bmatrix} (V_{1,f_{m1}} + I_{M_1,f_{m1}} Z_{M_1,f_i}) & V_{1,f_{m2}} & \cdots & V_{1,f_{m10}} \\ V_{2,f_{m1}} & (V_{2,f_{m2}} + I_{M_2,f_{m2}} Z_{M_2,f_j}) & \cdots & V_{2,f_{m10}} \\ \vdots & \vdots & \vdots & \vdots \\ V_{1,f_{m1}} & \cdots & \cdots & (V_{10,f_{m10}} + I_{M_{10},f_{m10}} Z_{M_{10},f_j}) \end{bmatrix}$$

$$\begin{bmatrix} C_{m1,j} \\ C_{m2,j} \\ \vdots \\ C_{m10,j} \end{bmatrix} = \begin{bmatrix} -V_{1,f_j} \\ -V_{2,f_j} \\ \vdots \\ -V_{10,f_j} \end{bmatrix}$$

where V comprises the measured voltages at the corresponding monitor electrode, I comprises the leakage current through the corresponding monitoring electrode, and Z comprises the internal coupling impedance of the corresponding electrode. Based on the above, the modified unfocused voltages with the monitor electrode to reference electrode internal coupling impedance included can be written with the following equation:

$$\overline{V}_{i,f_j} = V_{i,f_j} + C_{m1,j} V_{i,f_{m1}} + C_{m2,j} V_{i,f_{m2}} + \ldots + C_{m10,j} V_{i,f_{m10}}$$

for i=1, . . . , 10 and j=0, . . . , 5. Finally, the voltages $\overline{V}_{i,f_j}$ may be focused using the one or more focusing equations to obtain the modified database. One example the focusing equation for the focused apparent resistivity of mode 1 is given by the equation $$R_{a,1} = k_1 \frac{\overline{V}_1}{\overline{I}_0}$$

where $\overline{V}_1 = \overline{V}_{1,f_1} + C_{1,1} \overline{V}_{1,f_0} + C_{1,2} \overline{V}_{1,f_2}$, and $\overline{I}_0 = C_{1,1} I_{0,f_0}$, and $k_1$ comprises the tool constant of focused mode 1. The weighting constants $C_{1,1}$ and $C_{1,2}$ may comprise the solution of the following matrix equation $$\begin{bmatrix} \Delta \overline{V}_{1,2,f_0} & \Delta \overline{V}_{1,2,f_2} \\ I_{0,f_0} & I_{2,f_2} \end{bmatrix} \begin{bmatrix} C_{1,1} \\ C_{1,2} \end{bmatrix} = \begin{bmatrix} -\Delta \overline{V}_{1,2,f_1} \\ -I_{1,f_1} \end{bmatrix}$$

where $\Delta \overline{V}_{1,2,f_j}$ comprises the potential difference between monitoring electrodes 1 and 2 when the tool is excited with frequency $f_j$; and $I_{i,f_j}$ is the current injected from electrode $A_i$ when the tool is excited with frequency $f_j$.

Step 504 may comprise generating current and voltage measurements with the galvanic tool. This may include positioning the galvanic tool within a borehole in a subterranean formation as part of a drilling assembly or wireline logging apparatus. Generating the current and voltage measurements may include using a control unit of the galvanic tool to inject current into the formation and measure the resulting voltage response, as described above. Step 505 may comprise measuring the downhole temperature at each measurement point. Step 506 may comprise applying focusing to the measured voltages based at least in part on the measured voltage, current, and temperature to compute the apparent formation resistivities at each measurement point. Focusing may comprise software focusing using one or more software focusing algorithms that would be appreciated by one of ordinary skill in the art in view of this disclosure. The application of software focusing may occur, for instance, at an information handling system remote from the galvanic tool, for instance, after the raw voltage, current, and temperature measurements are received at the information handling system.

At step 507, the modified inversion database may be accessed to further process the computed apparent formation resistivities to produce the true resistivity of the formation at each logging point. An example inversion scheme may convert measured apparent resistivities to true formation parameters, such as formation resistivity, depth of invaded zone, and resistivity of invaded zone. In certain embodiments, the pre-computed database of tool responses corrected for monitoring electrodes leakage is used for inversion. The measured response may be compared to the pre-computed responses in the database and an iterative numerical solver is used to minimize the difference between the two. A numerical model of the formation may be constructed for forward modeling. A number of constraints consistent with a priori knowledge of the formation can be used to single out the correct physical solution. After convergence of the inversion, the formation parameter can be obtained.

Figure 6:
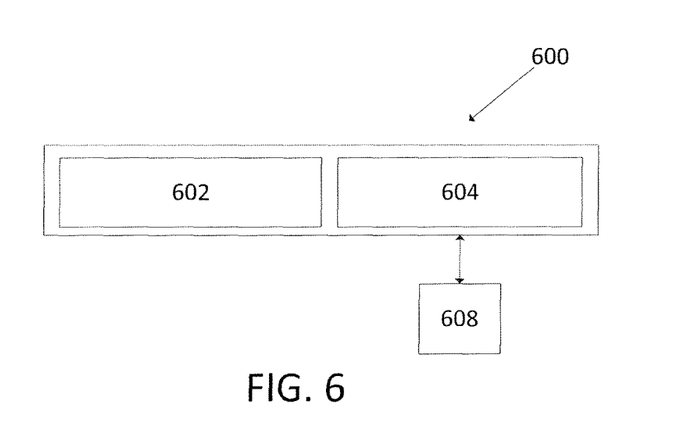
FIG. 6 is a diagram of an example information handling system, according to aspects of the present disclosure.

As described above, an information handling system may receive raw measurements from a galvanic tool and process the raw measurements to determine a resistivity value for the formation. FIG. 6 illustrates a block diagram of an example information handling system 600, in accordance with embodiments of the present disclosure. Information handling system 600 or components thereof can be located at the surface, downhole, or some combination of both locations (e.g., certain components may be disposed at the surface while certain other components may be disposed downhole, with the surface components being communicatively coupled to the downhole components).

As depicted, information handling system 600 includes a processor 602. The processor 602 may include, for example a microprocessor, microcontroller, digital signal processor (DSP), application specific integrated circuit (ASIC), or any other digital or analog circuitry configured to interpret and/or execute program instructions and/or process data. In some embodiments, processor 602 may be communicatively coupled to memory 604. Processor 602 may be configured to interpret and/or execute program instructions or other data retrieved and stored in memory 604. Program instructions or other data may constitute portions of software 606 for carrying out one or more methods described herein. Memory 604 may include any system, device, or apparatus configured to hold and/or house one or more memory modules; for example, memory 604 may include read-only memory (ROM), random access memory (RAM), solid state memory, or disk-based memory. Each memory module may include any system, device or apparatus configured to retain program instructions and/or data for a period of time (e.g., computer-readable non-transitory media). For example, instructions from software 606 may be retrieved and stored in memory 604 for execution by processor 602.

Modifications, additions, or omissions may be made to FIG. 6 without departing from the scope of the present disclosure. For example, FIG. 6 shows a particular configuration of components of information handling system 600. However, any suitable configurations of components may be used. For example, components of information handling system 600 may be implemented either as physical or logical components. Furthermore, in some embodiments, functionality associated with components of information handling system 600 may be implemented in special purpose circuits or components. In other embodiments, functionality associated with components of information handling system 600 may be implemented in configurable general purpose circuit or components. For example, components of information handling system 600 may be implemented by configured computer program instructions.

According to aspects of the present disclosure, an example method includes computing a database for an ideal representation of a galvanic tool, and determining internal coupling impedance between at least one monitor electrode of the galvanic tool and a reference. Voltage and current measurements from the galvanic tool positioned within a formation may be received. A formation resistivity from the voltage and current measurements may be calculated based, at least in part, on the database and the determined internal coupling impedances.

In one or more embodiments described in the preceding paragraph, the method further includes injecting the determined internal coupling impedance into an existing inversion database and calculating a modified inversion database.

In one or more embodiments described in the preceding paragraph, calculating the formation resistivity from the voltage and current measurements based, at least in part, on the database and the determined internal coupling impedances comprises calculating the formation resistivity from the voltage and current measurements based, at least in part, on the modified inversion database.

In one or more embodiments described in the preceding three paragraphs, computing the database for the ideal representation of the galvanic tool comprises computing a database corresponding to one or more excitation modes of the ideal representation of the galvanic tool.

In one or more embodiments described in the preceding four paragraphs, the method further includes positioning the galvanic tool within a borehole in a subterranean operation.

In one or more embodiments described in the preceding five paragraphs, the method further includes receiving temperature measurements from the galvanic tool positioned within a formation.

In one or more embodiments described in the preceding paragraph, the method may further include calculating the formation resistivity from the voltage and current measurements based, at least in part, on the database, the determined internal coupling impedances, and the temperature measurements.

In one or more embodiments described in the preceding paragraph, the method may further include applying focusing to the measured voltages based at least in part on the measured voltage, current, and temperature to compute an apparent formation resistivity.

In one or more embodiments described in the preceding paragraph, calculating the formation resistivity from the voltage and current measurements based, at least in part, on the database and the determined internal coupling impedances comprises applying an inversion to the apparent formation resistivity.

According to aspects of the present disclosure, an example system may include a galvanic tool with at least two electrodes and an information handling system communicably coupled to the galvanic tool. The information handling system may comprises a processor and memory device coupled to the processor. The memory device may contain a set of instructions that, when executed by the processor, cause the processor to compute a database for an ideal representation of a galvanic tool; determine an internal coupling impedance between at least one monitor electrode of the galvanic tool and a reference; receive voltage and current measurements from the galvanic tool positioned within a formation; and calculate a formation resistivity from the voltage and current measurements based, at least in part, on the database and the determined internal coupling impedances.

In one or more embodiments described in the preceding paragraph, the set of instructions may further cause the processor to inject the determined internal coupling impedance into an existing inversion database and calculate a modified inversion database.

In one or more embodiments described in the preceding two paragraphs, the set of instructions that cause the processor to calculate the formation resistivity from the voltage and current measurements based, at least in part, on the database and the determined internal coupling impedances further cause the processor to calculate the formation resistivity from the voltage and current measurements based, at least in part, on the modified inversion database.

In one or more embodiments described in the preceding three paragraphs, the set of instructions that cause the processor to compute the database for the ideal representation of the galvanic tool further causes the processor to compute a database corresponding to one or more excitation modes of the ideal representation of the galvanic tool.

In one or more embodiments described in the preceding four paragraphs, the set of instruction cause the processor to position the galvanic tool within a borehole in a subterranean operation.

In one or more embodiments described in the preceding five paragraphs, the set of instructions cause the processor to receive temperature measurements from the galvanic tool positioned within a formation.

In one or more embodiments described in the preceding paragraph, the set of instructions further cause the processor to calculate the formation resistivity from the voltage and current measurements based, at least in part, on the database, the determined internal coupling impedances, and the temperature measurements.

In one or more embodiments described in the preceding paragraph, the set of instructions further cause the processor to apply focusing to the measured voltages based at least in part on the measured voltage, current, and temperature to compute an apparent formation resistivity.

In one or more embodiments described in the preceding paragraph, the set of instructions further cause the processor to calculate the formation resistivity from the voltage and current measurements based, at least in part, on the database and the determined internal coupling impedances comprises applying an inversion to the apparent formation resistivity.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method, comprising:
computing a database for an ideal galvanic tool, wherein the database comprises voltage and current responses of the ideal galvanic tool with infinite internal coupling impedances to one or more excitations;
determining internal coupling impedance between at least one monitor electrode of galvanic tool and a reference electrode of the galvanic tool;
receiving voltage and current measurements generated with the galvanic tool positioned within a formation, wherein the voltage and current measurements correspond to at least a strength of a current generated by a survey electrode of the galvanic tool, a strength of one or more leakage currents received through the at least one monitor electrode and a current electrode, and a voltage measurement from the at least one monitor electrode, and wherein the at least one monitor electrode is disposed between the survey electrode and the current electrode;
modifying the database based on the determined internal coupling impedance and the voltage and current measurements; and
calculating a formation resistivity based, at least in part, on the modified database.

2. The method of claim 1, further comprising injecting the determined internal coupling impedance into the modified database.

3. The method of claim 2, wherein the modified database is a modified inversion database.

4. The method of claim 1, wherein computing the database for the ideal representation of the galvanic tool comprises computing a database corresponding to one or more excitation modes of the ideal representation of the galvanic tool.

5. The method of claim 1, further comprising positioning the galvanic tool within a borehole in a subterranean operation.

6. The method of claim 1, further comprising receiving temperature measurements from the galvanic tool positioned within a formation.

7. The method of claim 6, further comprising calculating the formation resistivity based, at least in part, on the temperature measurements.

8. The method of claim 7, further comprising applying focusing to the measured voltages based at least in part on the measured voltage, current, and temperature to compute an apparent formation resistivity.

9. The method of claim 8, wherein calculating the formation resistivity comprises applying an inversion to the apparent formation resistivity.

10. A system, comprising:
a galvanic tool comprising a survey electrode, a current electrode and a monitor electrode, wherein the monitor electrode is disposed between the survey electrode and the current electrode;
an information handling system communicably coupled to the galvanic tool, the information handling system comprises a processor and memory device coupled to the processor, the memory device containing a set of instruction that, when executed by the processor, cause the processor to:
compute a database for an ideal galvanic tool, wherein the database comprises voltage and current responses of the ideal galvanic tool with infinite internal coupling impedances to one or more excitation;
determine an internal coupling impedance between at least one monitor electrode of the galvanic tool and a reference electrode;
receive voltage and current measurements generated with the galvanic tool positioned within a formation, wherein the voltage and current measurements correspond to at least a strength of a current generated by the survey electrode of the galvanic tool, a strength of one or more leakage currents received through the monitor electrode and the current electrode, and a voltage measurement from the monitor electrode;
modify the database based on the determined internal coupling impedance and the voltage and current measurements; and
calculate a formation resistivity based, at least in part, on the modified database.

11. The system of claim 10, wherein the set of instructions further cause the processor to inject the determined internal coupling impedance into the modified database.

12. The system of claim 10, wherein the modified database is a modified inversion database.

13. The system of claim 10, wherein the set of instructions that cause the processor to compute the database for the ideal representation of the galvanic tool further causes the processor to compute a database corresponding to one or more excitation modes of the ideal representation of the galvanic tool.

14. The system of claim 10, wherein the set of instruction cause the processor to position the galvanic tool within a borehole in a subterranean operation.

15. The system of claim 10, wherein the set of instructions cause the processor to receive temperature measurements from the galvanic tool positioned within a formation.

16. The system of claim 15, wherein the set of instructions further cause the processor to calculate the formation resistivity based, at least in part, on the temperature measurements.

17. The system of claim 16, wherein the set of instructions further cause the processor to apply focusing to the measured voltages based at least in part on the measured voltage, current, and temperature to compute an apparent formation resistivity.

18. The system of claim 17, wherein the set of instructions further cause the processor to calculate the formation resistivity by applying an inversion to the apparent formation resistivity.

* * * * *